Figures 1, 2, 3, 4, 5:
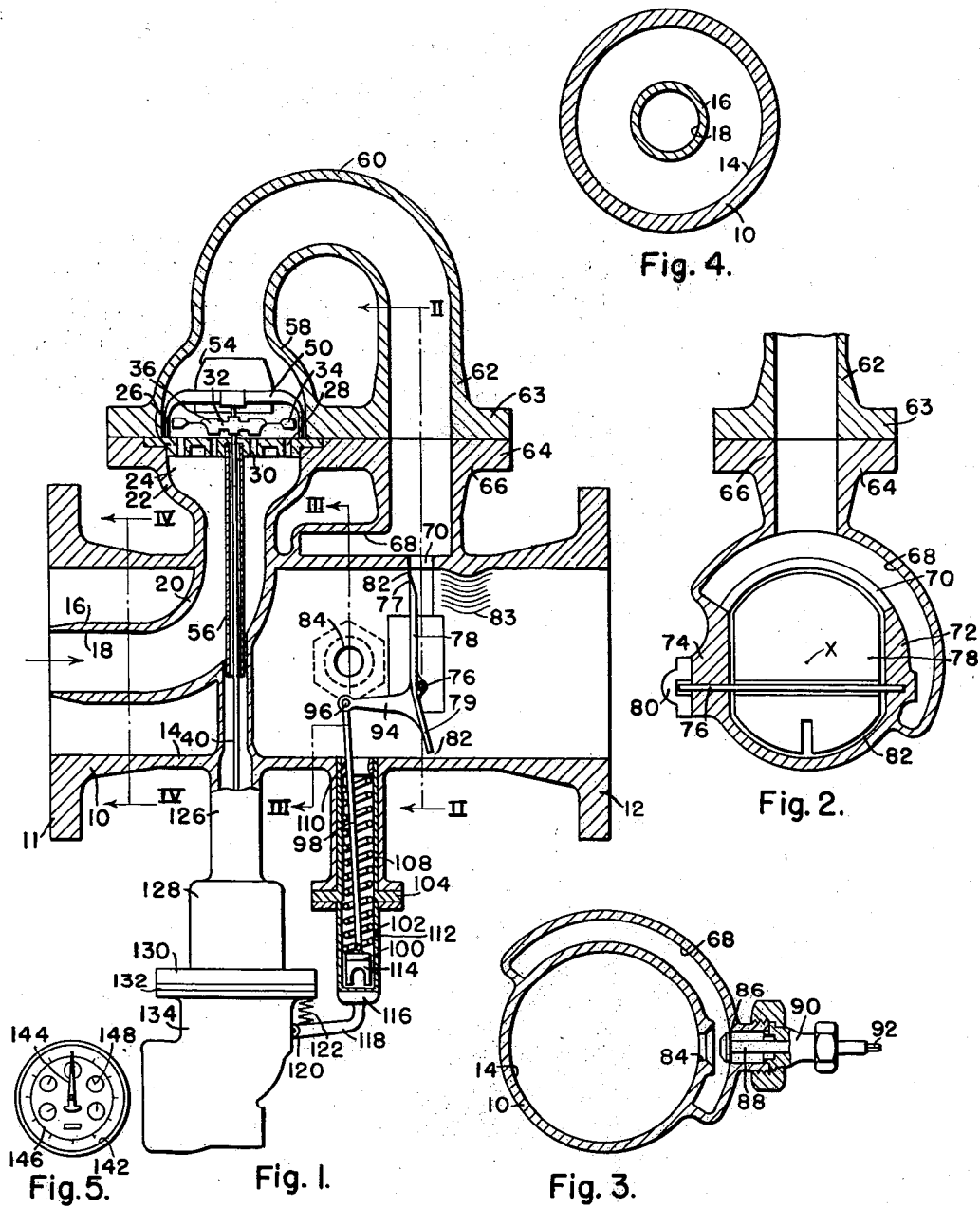

INVENTOR
Wilbur W. Stevenson.
BY
Frederick Shapo
ATTORNEY

May 29, 1956  W. W. STEVENSON  2,747,403
FLUID METER
Filed May 25, 1953  4 Sheets-Sheet 2
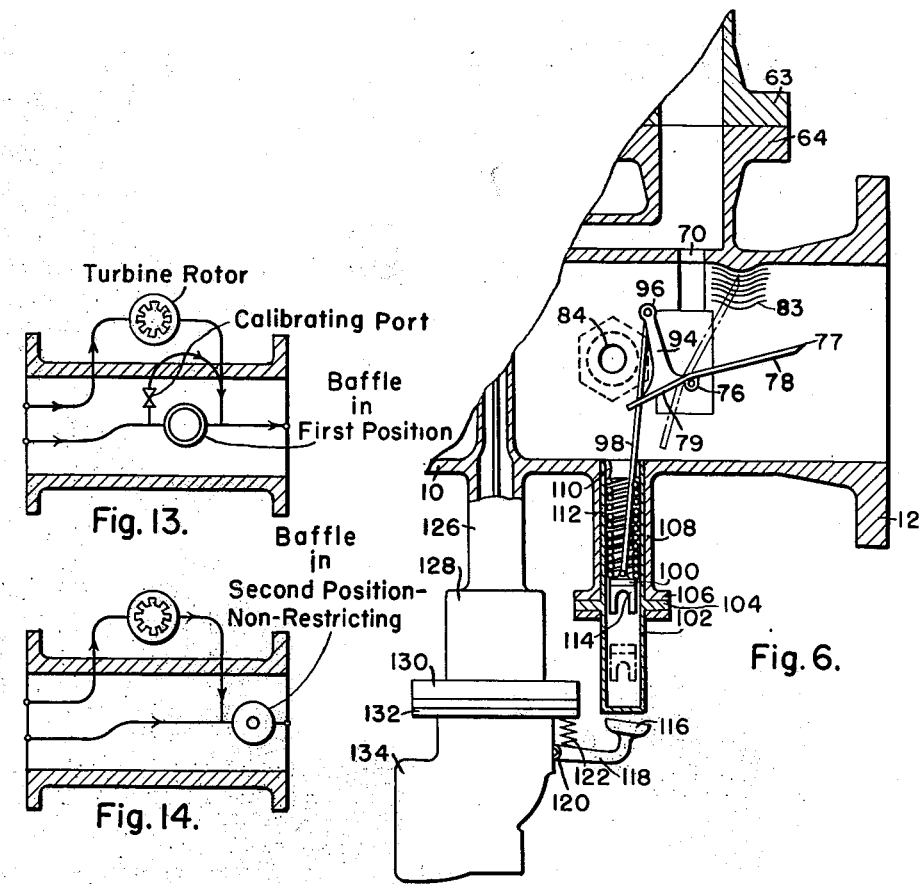
Fig. 13.
Fig. 14.
Fig. 6.
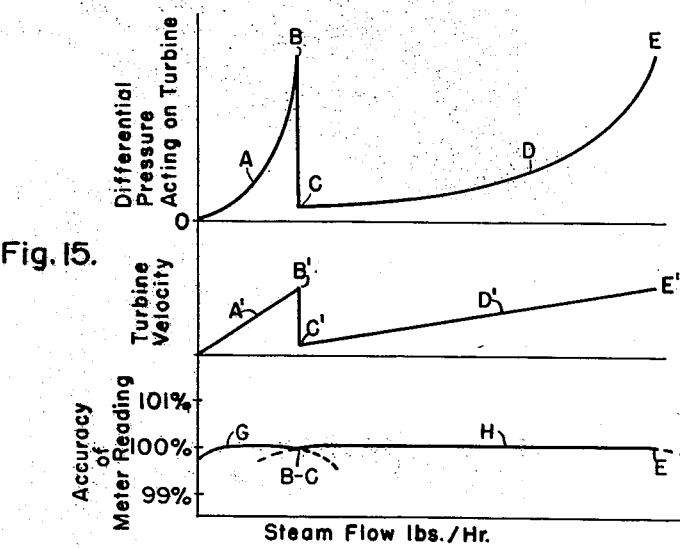
Fig. 15.
INVENTOR
Wilbur W. Stevenson.
BY
Frederick Shapoe
ATTORNEY May 29, 1956  W. W. STEVENSON  2,747,403
FLUID METER
Filed May 25, 1953  4 Sheets-Sheet 3

INVENTOR
Wilbur W. Stevenson
BY
Frederick Shapoe
ATTORNEY

May 29, 1956 W. W. STEVENSON 2,747,403
FLUID METER
Filed May 25, 1953 4 Sheets-Sheet 4

INVENTOR
Wilbur W. Stevenson
BY
Frederick Shapoe
ATTORNEY

United States Patent Office 2,747,403
Patented May 29, 1956

2,747,403

FLUID METER

Wilbur W. Stevenson, Pittsburgh, Pa.

Application May 25, 1953, Serial No. 356,992

9 Claims. (Cl. 73—203)

This invention relates to fluid meters, and in particular to turbine type flow meters, useful in measuring the amount of a gaseous fluid, such as steam, flowing through a conduit.

It has long been desirable to provide fluid meters for measuring the actual amount of a fluid, such as steam, passing through a conduit over an extremely wide range of flow rates. In turbine type flow meters actuated by the steam flowing through the conduit, there is usually a limited range of flow rates at which the turbine will revolve at a velocity directly proportional to the steam flow rate so that each turn of the turbine will correspond to a given weight of steam, within, say, better than 1% accuracy. At flow rates outside of this range, the velocity of rotation of the turbine departs substantially from an accurate proportionality to the amount of steam passing through the conduit. The degree of error becomes greater as the operation proceeds further beyond such limits. A suitable register is connected to the turbine to integrate its revolutions in terms of, for example, pounds of steam.

Inasmuch as the amount of steam being delivered through a conduit will vary in a range from substantially zero up to the maximum that can be carried by the conduit for given conditions, at one or both extremities of this range, such steam flow rates will extend beyond the accurate range of the turbine. Accordingly, known turbine type meters will record the flow of the steam inaccurately over a substantial part of the total range of flow rates through the conduit. Usually the meter is so constructed and adapted to a conduit that the most accurate readings occur at the maximum flow rates of steam through the conduit, and the inaccurate readings are at low steam flow rates. However, in many instances, the flow of steam at low or moderate flow rates will take place for prolonged periods of time. Consequently, the meter error will eventually aggregate a large amount.

In accordance with the present invention, I have produced a meter wherein the turbine operates within its accurate range for low steam flow rates in a conduit, and then at the upper limit of this range, as the steam flow increases, suitable mechanism suddenly alters the steam pressure operating on the turbine so that the turbine reverts to operation at a low point of its accurate range and continues along the range up to the maximum flow in the conduit, and, in effect, repeats operation with great accuracy so as to cover the entire range from low to high steam flow rates. The register mechanism operated by the turbine is adjusted to correctly indicate the true amount of steam flowing for all these conditions. Thereby a single turbine element functions accurately over a wide range of steam flow rates.

An object of this invention is to provide a flow meter so associated with a conduit carrying a gaseous fluid whose flow is to be measured that the turbine and register of the meter cooperate to integrate the flow accurately both over low flow rates and then at higher flow rates in two separate adjoining steps.

Another object of the invention is to provide a flow meter for gaseous fluids in a conduit which meter correlates the operation of a turbine rotor with a register operated by the rotor whereby at low flow rates of a gaseous fluid in the conduit, the turbine revolves at a high velocity up to a given point and, after this point, at higher flow rates the turbine operates at relatively lower speeds and the register mechanism compensates for such variations in turbine wheel speed in order to record the true flow.

A still further object of the invention is to provide a flow meter having a flow tube diverting a portion of the gaseous fluid passing through a conduit, to a single turbine rotor having both driving blades and damping vanes.

A still further object of the invention is to provide a flow meter having a flow tube conveying a portion of the total gaseous fluid passing through a conduit to a single turbine rotor, the exhaust from the rotor returning to the conduit, and movable baffle means for controlling the total pressure differential therebetween.

A still further object of the invention is to provide a conduit with a baffle movable to two positions whereby to control the pressure drop of a fluid in the conduit on either side of the baffle to two distinct values depending on the flow rate of gaseous fluid in the conduit, and means to operate a flow meter in accordance with the baffle position.

Other objects of the invention will in part be obvious and will in part appear hereinafter.

Figure 9:
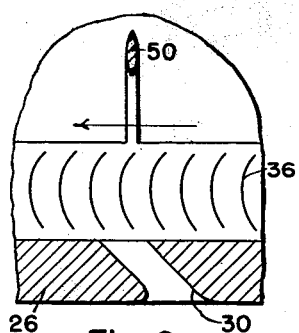
Figure 10:
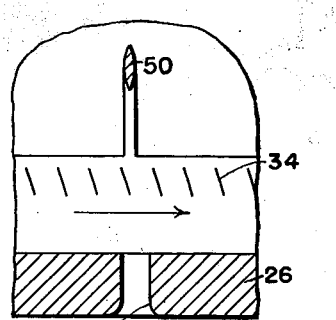
Figure 7:
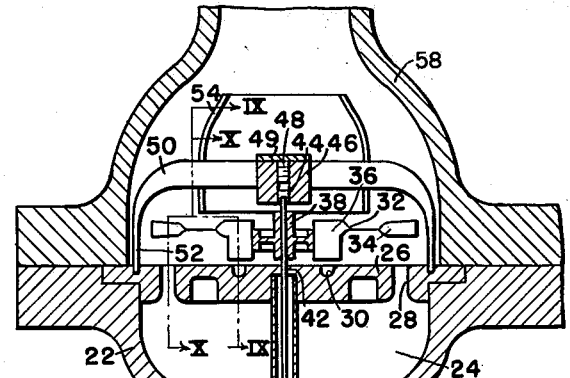
Figure 11:
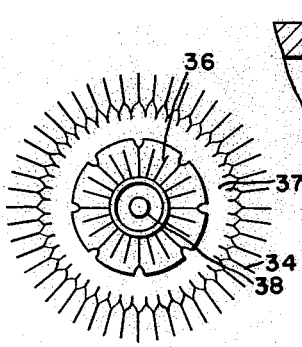
Figure 8:
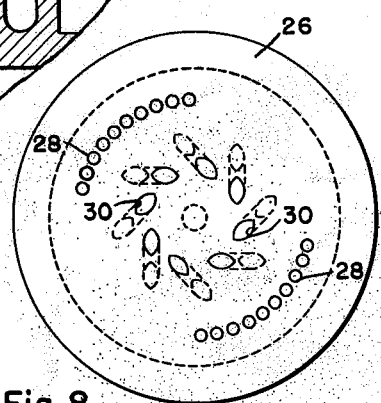
Figure 12:
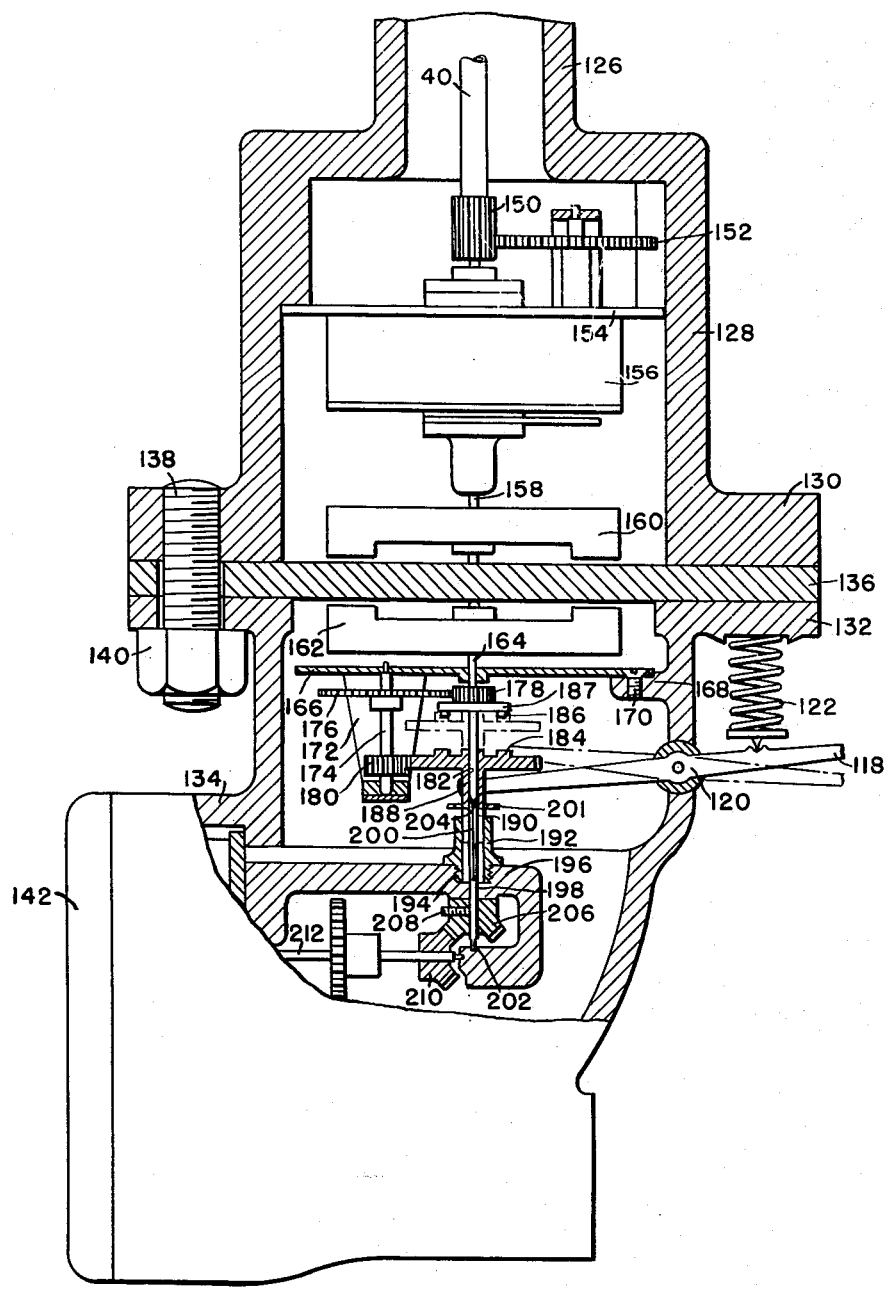

For a better understanding of the nature and objects of the invention, reference should be had to the following detailed description and drawings, in which:

Figure 1 is a view in elevation partly in section through a complete meter unit constructed in accordance with the invention, Fig. 2 is a section on line II—II of Fig. 1, Fig. 3 is a cross section on line III—III of Fig. 1, Fig. 4 is a cross section along the line IV—IV of Fig. 1, Fig. 5 is a view of the register face alone, Fig. 6 is a fragmentary view partly in section of the meter, Fig. 7 is an enlarged fragmentary view of the turbine rotor, Fig. 8 is a plan view of the nozzle disk associated with the turbine rotor, Fig. 9 is a fragmentary enlarged cross section along the line IX—IX of Fig. 7, Fig. 10 is a fragmentary enlarged cross section along the line X—X of Fig. 7, Fig. 11 is a plan view of the turbine rotor proper, Fig. 12 is an enlarged view partly in section of the register mechanism, Fig. 13 is a schematic view showing the flow of fluid through the meter at low flow rates, Fig. 14 is a schematic view showing the flow of fluid through the meter at high flow rates, and Fig. 15 is a graph showing the correlation between steam flow against the pressure acting on the turbine and the meter register.

Briefly, the mode of operation of the flow meter of this invention is such that a small portion of the steam, for example, flowing through a conduit is intercepted and conveyed by a Pitot tube type of flow tube to a turbine rotor which, in turn, is connected to a register. At low flow rates up to a predetermined value, a constricting baffle, shaped like a butterfly valve, is placed in the conduit so that static pressure in the conduit builds up rapidly upstream of the baffle in proportion to the increasing flow of steam. This pressure is transmitted to the flow tube and to the turbine. The steam exhausts from the turbine into a port disposed on the downstream side of the baffle and, therefore, a substantial pressure differential or drop actuates the turbine. As a result, the turbine will operate at a relatively high rate of speed for a given flow rate in the conduit. When the steam flow in the conduit reaches the predetermined value, the baffle will suddenly snap to a second position in which it no longer materially impedes flow of steam through the conduit. There is an immediate sharp drop in the pressure differential acting on the turbine whereby the speed of the turbine for a given flow rate decreases by a substantial factor from what it would have been if the baffle were in its original position. Above the predetermined flow rate the pressure of the steam in the flow tube and acting on the turbine is determined primarily by the velocity head of the steam passing through the conduit. The turbine operates the register to integrate accurately all flow rates above this point up to the maximum flow ordinarily expected through the conduit. At the instant that the baffle assumes this second position, the register mechanism is shifted by a suitable gearing to speed up the registration in direct proportion that the speed of the turbine is reduced. As a result, the meter is so constructed and arranged that it records the steam passing through the conduit with a high degree of accuracy both at the low flow rates and also at the high flow rates which cover substantially the entire range of steam flow rates for which the conduit is employed.

It will be understood that while the term "steam" will be employed hereinafter in describing the functioning of the meter, the flow of other gaseous fluids may be similarly measured, and the meter will operate similarly with any other gaseous fluid.

Referring to Fig. 1 of the drawings, there is illustrated the complete meter, partly in section, constructed in accordance with the present invention. The meter comprises a conduit 10 having an inner wall 14 through which steam whose flow is to be measured passes from left to right. The conduit is provided with flanges 11 and 12 to be connected with a steam line from which the steam will enter and leave the meter. Projecting through the inner wall 14 into the conduit 10 is a Pitot tube type of flow tube 16 with an inner wall 18, in order to intercept and divert a portion of the steam passing through the conduit. In the figure, the ratio of diameters of the walls 14 and 18 is of the order of 3:1. Accordingly, the conduit will carry approximately 9 times the volume of steam that will be carried within the flow tube 16. It should be understood, however, that their cross-sectional area ratios may vary substantially from this value. For most purposes, the ratio of cross-sectional areas of the conduit 10 to the flow tube 16 will be somewhere from 6:1 to 100:1. However, in extreme cases the ratios may be greater or smaller. The flow tube 16 is so disposed that its opening or nozzle is directed into the direction from which the steam comes, and it is essentially a Pitot tube.

Steam intercepted by the flow tube 16 is conveyed through the right angle bend 20 into an enlarged portion 22 forming a chamber 24. Steam within the chamber 24 is at a pressure which is the sum of the static pressure in the conduit 10 in which the flow tube 16 is disposed plus the kinetic or velocity head built up within the flow tube 16 by reason of the velocity of the steam travelling in the conduit. The steam in chamber 24 then passes through a nozzle plate 26 containing an outer ring of vertically disposed nozzles 28 directing the steam against outer peripheral damping vanes 34 of a turbine wheel 32, and inner peripheral nozzles 30 disposed at a substantial angle to the vertical and directed to convey the steam against driving blades 36 of the turbine wheel 32. Details of the nozzle plate 26 are shown in Fig. 8.

As shown in Figs. 7, 9, 10 and 11, the damping vanes 34 and driving blades 36 are mounted on a single turbine hub 38 which is mounted fixedly on a shaft 40. The driving blades 36 are of relatively efficient curved form, and are affixed to the hub 38. The tips of the blades 36 are attached to a rim plate 37 which carries the relatively flat damping vanes 34. I have found it to be quite desirable to place the driving blades and damping vanes in the relative positions shown in order to secure most accurate results. The force developed by the driving blades 36 is quite substantial while the force developed on the damping vanes 34 is in the opposite direction and is much less because the flat blades 34 are at only a slight angle to the vertical and are inherently less efficient. The damping vanes 34 are required to prevent racing of the turbine wheel and to absorb excess energy. However, the driving blades develop sufficient force to drive the wheel 32 at all times against any force developed by the damping blades.

Referring to Fig. 7 in particular, which shows the details of the construction centered about the turbine wheel portion of the mechanism, it will be noted that the shaft 40 passes freely through a close fitting opening 42 in the nozzle plate 26. The upper end of the shaft 40 is mounted in a low friction bearing 44 which may comprise a jewel or ball bearing or the like. A housing 46 with a spring 48 maintains the bearing 44 in contact with the shaft. A cover 49 retains the spring under compression. The housing 46 is supported on a two-armed spider 50 having two vertical legs 52 fastened to the nozzle plate 26. It may be desirable, though not necessary, to provide a flow hood 54 attached to the spider 50 in order to guide the exhaust steam from the driving blades 36 and the vanes 34. Affixed to the lower portion of the nozzle plate 26 is a hollow tube 56 enclosing the shaft 40 and protecting it from any undesirable effects that may be produced by the flow of steam through the flow tube 16 and bend 20.

Steam exhausting from the turbine wheel 32 enters a bell-shaped chamber 58 and thence it passes through a U-bend 60 and a tangent 62, as shown in Fig. 1 of the drawings. The chamber 58, U-bend 60 and tangent 62 may be cast in a single piece with a flange 63 fitting a mating flange 64 forming a part of the conduit member 10. Suitable gasketing (not shown) is disposed between the flanges 63 and 64. The tangent 62 leads the exhaust steam to a tubular chamber 66 which terminates in a semi-circular jacket portion 68 surrounding the end of the conduit 10 on the downstream side from the portion having the flow tube 16. The conduit 10 contains a slotted port 70 through which exhaust steam may escape from chamber 66 and semicircular jacket 68 into the conduit.

The turbine wheel 32 is rotated by the steam diverted by the flow tube 16 in proportion to the pressure differential between the steam in chamber 24 and the steam pressure in the chamber 58 which latter pressure is substantially at the pressure at port 70. For a 6 inch conduit having a flow tube 16 2 inches in diameter, the maximum differential pressure of steam on turbine wheel 32 may be approximately one pound per square inch. This pressure differential will vary and is only exemplary. This occurs at a steam flow of 4,000 pounds per hour at a pressure of approximately ten pounds gage.

Referring to Fig. 2 of the drawing in particular, the conduit 10 at the slot 70 is formed with two flattened bosses 72 and 74 in which is mounted a shaft 76 pivotally supporting a movable baffle 78. In the position shown in Figs. 1 and 2 of the drawings, the baffle 78 presents its maximum restriction to the flow of steam through the conduit 10. In this position, there is a clearance 82 between the baffle 78 and wall 14 of the order of $\frac{1}{16}$ to $\frac{1}{8}$ inch for a 6 inch diameter steam conduit. This clearance may be varied, depending on the gage pressure of the steam, the maximum steam flow and other factors. A sealing cap 80 is attached to the boss 74 to retain the shaft 76 in place and enable it to be withdrawn. Withdrawing the shaft 76 will free the baffle so that it can be removed from the conduit 10. It will be observed baffle 78 is mounted eccentrically on the shaft 76 so that the center of steam pressure is at the point X which is substantially above the axis of the shaft 76. The baffle has a lower portion 79 at an angle of about 20° to the vertical in the counterclockwise direction.

Referring to both Figs. 1 and 3 of the drawings, attention is directed to a circular port 84 opening from the jacket portion 68 to the conduit 10 at a point ahead of the baffle 78. The port 84 is constructed to cooperate with a manually adjustable valve 86 mounted on a stem 88 within a bonnet 90 suitably packed to prevent escape from steam from the conduit. An external squared end 92 enables the shaft 88 to be turned and thereby moved on suitable screw threading (not shown) so that the valve 86 may be moved toward or away from the port 84 and thereby regulate the by-pass flow of steam from the left-hand end of the conduit 10 to chamber 68. The valve 86 and port 84 are provided to enable the calibrating of the meter in order to compensate for errors in manufacture and fit of the parts of the entire apparatus.

Referring to both Figs. 1 and 6 of the drawings, there is shown mechanism for operating the baffle 78. The baffle 78 carries a rigid bell crank arm 94 having a pivot 96 affixed to a control rod 98. The baffle can move from the maximum restricting position shown in Fig. 1 which will hereinafter be designated as the "first position" to a position within the range of positions between that which is shown in dotted lines to that shown in solid lines in Fig. 6 of the drawings in which the baffle exerts its least resistance to the flow of steam through the conduit, which range of positions shall be hereinafter designated as the "second position" or open position. As the gas flow in the conduit increases the baffle will first snap over to the dotted line position shown in Fig. 6 or just a little therebeyond, where it allows the gas to flow freely both past the upper edge and the lower edge of the baffle 78, since the clearance space is increased, and with increasing gas flow the baffle assumes a more and more horizontal position thereby progressively opening the conduit to a full open condition. The lower end of the rod 98 is pivotally attached to a piston member 100 movable within a closed end tube 102. The tube 102 is provided with a flange 104 which seats against a flange 106 of a tubular extension 108 attached to the conduit 10. Suitable fastening means are employed to retain the tube 102 in fixed position against the flange 106. The upper end of the tube 102 is provided with a ferrule 110 having a center opening to accommodate movement of the rod 98. Between the ferrule 110 and the piston 100 is disposed a compression spring 112 tending to drive the piston to the lower end of the tube 102. It will be noted that the tube 102 is completely closed at its lower end.

The tube 102 is constructed of brass, stainless steel or other non-magnetic material. Attached to the piston 100 is a powerful permanent magnet 114 constructed of an alloy such as that known as Alnico or the like. A member 116 of iron, steel or other magnetizable material is adapted to move against and contact the closed lower end of the tube 102 under the attracting influence of the magnet 114. The magnetizable member 116 is affixed to the end of a lever arm 118 movable about a pivot 120. A compression spring 122 tends to move the lever arm 118 in a clockwise direction against the magnetic attractive force between the magnet 114 and the magnetizable member 116. The spring 122 is substantially weaker than the attractive force between the magnet 114 and the member 116 as long as the magnet 114 is in a position adjacent the closed end of the tube 102. However, when the magnet 114 is moved upwardly by the rod 98 for a distance of a half inch or so, the magnetic forces acting on the member 116 are less than the compressive force in spring 122 and in that event the lever arm 118 is moved clockwise a distance of about ¼ inch to the position shown in Fig. 6 of the drawings.

The combined strength of the compression spring 112 and the magnetic force exerted between magnet 114 and the member 116 constitutes a total force on rod 98 capable of holding the baffle member 78 in the first position, as shown in Fig. 1 of the drawings, against the force exerted by steam traveling in the conduit 10 up to a selected flow rate of, for example, $\frac{1}{10}$ of the maximum steam flow within the conduit. Thus, for example, in a conduit that is intended to convey a maximum of 4,000 pounds of steam per hour, the spring 112 and magnet 114 will resist the turning moment against baffle member 78 up to a steam flow of approximately 400 pounds per hour. As this last flow rate is reached, the steam acting against the baffle 78 will exert a sufficient net force concentrated at point X which will exert a moment in the clockwise direction on the baffle with respect to the shaft 76 so that the baffle 78 will begin to turn clockwise. This rotation of the baffle will pull up rod 98 attached to the crank arm 94 whereby the gap separating the magnet 114 from the member 116 increases and the magnetic attractive force between them decreases rapidly. Therefore, within a short travel of not over a half inch, the magnetizable member 116 will have so little magnetic force attracting it that it will be forced away from the end of tube 102 by the compression spring 122 and this further separation reduces the magnetic attracting force between 114 and 116 to an insignificant value. Consequently, the baffle 78 is suddenly freed from this magnetic restraining force and, since the spring 112 is no longer capable of holding the baffle against the steam pressure, the baffle will move suddenly or snap to the second position, as shown in Fig. 6 of the drawings. This snap action is augmented by the fact that the effective lever arm between pivot 96 and shaft 76 is shortened as the baffle rotates, as will be apparent by comparing Figs. 1 and 6.

In order to insure that there will be sufficient force on the baffle 78 to move the magnet 114 away from the member 116 so as to insure the baffle moving completely over to the second position, a ridge 83 is provided to extend along the upper part of the conduit from boss 72 to 73 beginning with the downstream edge of port 70. The ridge 83 maintains a clearance with the upper arcuate edge 77 equal to clearance 82. Since the lower portion 79 of the baffle is turned about 20° from the vertical, the portion 79 will approach the wall 14 of the conduit while the baffle rotates through an angle of 20°. The net effect of ridge 83 and the portion 79 is to prevent loss of steam pressure on the baffle through rotation for 20°. After edge 77 passes ridge 83 and portion 79 begins to rise upwardly, the force of the magnet 114 becomes a negligible factor in restraining the baffle from turning. Owing to the shortening of the effective lever arm of crank 94 the spring 112 exerts a much lesser force than it would otherwise.

As a result, the baffle 78 is readily held by the flowing steam at flow rates above 400 pounds per hour, in the second position against the restraining force of spring 112. It should be understood that the force of the spring 112 is so adjusted that it will not be sufficient to return the baffle 78 to the first position until the steam flow in the conduit 10 falls below the predetermined flow rate point of, say, 400 pounds per hour in the particular example given.

The functioning of the meter under conditions wherein the baffle member 78 assumes the first and second position will be now described. In this connection reference should be had to Figs. 13 and 14 as well as Figs. 1 and 6. When the baffle member 78 is in the first position, as shown in Fig. 1, steam flowing in the conduit 10 from left to right is restricted so that a substantial back pressure is built up within the portion of conduit around the flow tube 18 to the left of the baffle member. The flow of steam is not entirely closed off, inasmuch as it can escape through the clearance areas 82 as well as the small port 84. The portion of the steam intercepted by the flow tube 16 is conveyed to the chamber 24, whereas it is at a pressure substantially determined by the restriction imposed by the baffle member 78. Under these conditions the major proportion of the pressure within chamber 24 is developed by static head and only a small part by the kinetic or velocity head at the flow tube. Inasmuch as the pressure at the downstream side of the baffle is substantially lower than the pressure is to the upstream side of the baffle, such reduced pressure effects a similar reduced pressure of the steam within 66, 62, 60 and the chamber 58. Steam flows through the ports 28 and 30 in the nozzle plate 26 and rotates the turbine wheel 32 in proportion to the square root of the pressure difference between chambers 24 and 58. The turbine member 32 is so constructed that it is operating within the range of maximum accuracy under these conditions. Consequently, the rotations of shaft 40 are in direct proportion to the actual pounds of steam traversing the conduit 10. A substantial part of the total steam flow passes through the turbine while the remainder by-passes through port 84 and past the clearance 82 about the periphery of the baffle member 78. This condition is illustrated diagrammatically in Fig. 13 of the drawings.

When the stream flow reaches a predetermined value which will correspond to substantially the upper limit of the range of accuracy of the turbine, the pressure on the baffle member 78 simultaneously reaches the predetermined point at which it moves sufficiently that the magnet 114 separates from the member 116 and consequently the restraining force on the baffle drops rapidly and the baffle member snaps over to the second position. When this happens, the baffle member is in a position where it does not appreciably restrict the flow of steam in the conduit 10. Consequently, the static pressure head previously supplying a major part of the operating pressure within chamber 24 drops to a negligible value. As a result, the rotation of the turbine wheel 32 drops considerably to a value of, for example, 1/10 the velocity it previously rotated at under the conditions arising from the maximum flow while the baffle 78 remained in the first position. At this second position the pressure within the flow tube 16 and chamber 24 is mainly derived from the velocity head of the steam passing through the conduit 10 by reason of its impingement on the open end of flow tube 18. Thereafter the rotational velocity of the turbine 32 is determined substantially entirely by the velocity of the steam passing through the conduit 10. This condition is illustrated diagrammatically in Fig. 14 of the drawings, wherein the main flow of steam is through the conduit and only a small portion is intercepted and passes through the turbine wheel. The port 84 does not affect the flow of steam in the conduit 10 when the baffle is in the second position.

In order to properly register or integrate the revolutions of the turbine 32 against the steam flow under these radically different conditions suitable corrections or compensations are carried out in the register mechanism. For details regarding the register mechanism reference should be had to Fig. 12 in particular. Depending from the underside of the conduit 10 is a tubular projection 126 within which the turbine shaft 40 rotates. The projection 126 leads to an enlarged casing 128 within which is mounted suitable gearing. The casing 128 has a flange 130 which is connected to a flange 132 of a casing 134 containing the register mechanism proper. A non-magnetic sealing plate 136 separates the casings 128 and 134.

The sealing plate 136 may be of stainless steel, brass or other suitable non-magnetic material. Suitable fastening means, such as a plurality of studs 138 and nuts 140, are employed to join the casing 128 and casing 134 through their flanges 130 and 132 so that the sealing plate 136 is held in leakproof engagement with the flange 130.

Looking at the left-hand side at the casing 134, there will be seen the face of the register mechanism, which, as shown in Fig. 5 of the drawings, comprises a bezel 142 which retains a glass window or the like in place. Through this window will be seen a pointer 144 and a dial 146 having indicia thereon. A plurality of other indicators 148 are present to indicate the flow of steam in pounds on scales differing by factors of 10, as is well known. Cyclometer type of dial mechanisms may be employed in lieu of the particular register dial shown.

Returning to Fig. 12 of the drawings, it will be observed that the shaft 40 from the turbine rotor revolves the gear 150 which engages with another gear 152, both being mounted for rotation on a plate 154. The gear 150 engages one or more other gears within the casing 156 which finally results in the shaft 158 revolving at a predetermined speed with respect to the speed of shaft 40. At the lower end of the shaft 158 is rigidly affixed a magnet 160 disposed with its poles close to but clearing the sealing plate 136. On the opposite side of the sealing plate 136 is disposed a second magnet 162 similar to the magnet 160. By reason of their mutual attraction, the magnet 162 tends to follow the magnet 160 closely as the former revolves whereby the rotation of magnet 160 is transferred to and produces a similar rotation of the magnet 162.

The magnet 162 is fixed to a stub shaft 164 held in place by a plate 166 mounted on one or more projections 168 formed as a part of the wall of the casing 134, and held in position by a screw fastening 170. Fastened to the plate 166 and depending therefrom is an L-shaped bracket 172 which holds a rotatable shaft 174 between the plate 166 and itself, as shown. The shaft 174 is provided with a large gear 176 which engages with a smaller gear 178 mounted on the stub shaft 164, both gears being rigidly affixed to their respective shafts. Accordingly, shaft 174 revolves at a reduced speed with respect to the speed of shaft 164. A gear 180 fixedly attached to the lower end of shaft 174 is disposed to engage with a clutch gear 182 having teeth 184 on its upper face engageable with teeth 186 projecting down from an enlarged rim 187 forming a part of gear 178. The clutch gear 182 is provided with a long hub 188 having a round extension 190 which has a central bore of square, splined or other non-circular cross-section. The extension 190 fits within a boss 192 having threads 194 holding it in fixed position in a frame 196. Directly below stub shaft 164 is shaft 198, mounted for rotational movement in a frame 196, which is provided with an upper square or other non-circular cross-section extension 200 which matches the bore within the projection 190 and fits therein, enabling both to rotate but permitting the clutch gear 182, hub 188 and extension 190 to move slidably up and down with respect to the extension 200. The lower end of the shaft 198 is provided with a pivot bearing 202 fitting into a recess in frame 196, while the upper end terminates in a flat face 204 which abuts against the lower end of the shaft 164; thereby the shafts 164 and 198 can rotate freely with respect to each other without being permitted to move axially.

The clutch gear 182 is movable vertically from the solid line position shown in Fig. 12 to an upper position shown in dotted lines in this figure. Such movement is caused when lever arm 118 is biased downwardly about pivot 120 by the compression spring 122. The lever arm 118 is provided at its other end inside the casing 134, with a bifurcated cam 188 that permits rotation of the hub 188 but can engage the underside of the gear 182 to move the clutch gear 182 upwardly to cause engagement of the teeth 184 and teeth 186. Conversely, the bifurcated cam 188 can engage a flange 201 affixed to the hub 186 and thus bring the clutch gear 182 downwardly out of clutching engagement with the gear 178 and on further downward movement it will engage with the gear 180. When the gear 178 is directly engaged with the clutch gear 182, the gear 182 will revolve at a much higher rate of speed than when the clutch gear 182 is disposed at its lower position where it revolves at a relatively slow speed resulting from the reduction gear train 178, 176, 180 and 182. Shaft 198 will revolve at the same speed as gear 182.

Attached to the lower end of the shaft 198 is a right angle bevel gear 206 retained on the shaft by the set screw 208. The bevel gear 206 engages with another bevel gear 210 fixedly attached to the horizontal shaft 212 which may be directly connected to the pointer 144 or connected through a suitable gear train to this pointer. The precise construction of the register mechanism proper is of no moment here since it may be constructed in various suitable ways as is well known in the art.

For a showing of the pressures, velocity of the turbine, and the accuracy of the meter, reference should be had to Fig. 15 which shows the pressure differential acting on the turbine at all steam flow rates and the corresponding accuracy of the meter readings at the register. Beginning at slightly above zero flow, the pressure acting on the turbine 32 follows curve A up to a maximum at point B. Up to a point B the baffle is in the first position. The velocity of the turbine is a straight line curve A' which reaches the point B'. The curve G indicates the degree of accuracy of the turbine and register in integrating the steam passing through the conduit. The turbine velocity is proportional to the pressure. At B the baffle snaps into the second position and the pressure acting on the turbine drops to a value C. The turbine decreases in velocity from B' to C' by a factor of $k$, which in practice may be a drop of about 10 to 1. The gearing shifts the clutch gear 184 to increase the speed of shaft 198 by a factor exactly equal to $k$, and, therefore, the register integrates the steam flow accurately. Thereafter the pressure difference acting on the turbine 32 follows curve D up to a maximum value E which last point corresponds to the maximum steam flow in conduit 10. The velocity of the turbine is shown by the straight line D' up to the maximum at E'. The curve H shows the accuracy of the meter for velocities along D' when the baffle is in the second position. The dotted lines at ends of curves G and H show the drop in accuracy that would take place if the turbine rotor were to operate beyond the velocity curves A' and D'.

It will be understood that the above detailed description and drawing is exemplary only and various obvious modifications and changes may be made by one skilled in the art without departing from the spirit of the invention.

I claim as my invention:

1. In a fluid meter for measuring the amount of a gas flowing through a conduit, in combination, a flow tube with an open nozzle disposed in said conduit, the nozzle directed into the flowing gas to divert a small fraction of the total gas flow from the conduit into the flow tube, a turbine member disposed to receive and to be rotated by the gas flowing in the flow tube, exhaust means for returning the gas from the turbine member to the conduit at a portion downstream with respect to the portion containing the nozzle, the turbine rotating at a velocity proportional to the pressure difference between the gas in the flow tube and the exhaust means, a register member operable by the rotating turbine member to indicate the amount of gas flow, the exhaust means including a port in the wall of the conduit, a baffle member disposed in the conduit between the flow tube and the port, the baffle member so constructed and fitting the walls of the conduit that at low gas flow rates it assumes a first position wherein a major portion of the cross-section of the conduit is closed and only a fractional part of the cross-section of the conduit remains open to gas flow, means for pivotally mounting and resiliently controlling the baffle member to enable it to move to a second position whereby the conduit is open to allow substantially unrestricted gas flow, the last means operating to cause the baffle member to snap over from the first position to the second position upon the rate of gas flow in the conduit reaching a predetermined value and to snap back whenever the rate of gas flow falls below this predetermined value, a shiftable two speed gearing mechanism connected to and disposed between the turbine member and the register, the gearing mechanism shiftable to impart given low or high velocity output to the register for a given turbine velocity, and means operatively connected to the means for pivotally mounting and resiliently controlling the baffle member to shift the gearing from a low velocity to a high velocity output as the baffle member snaps over from the first position to the second position and to shift back to a low velocity output as the baffle member snaps into the first position.

2. In a fluid meter for accurately measuring the amount of gas flowing through a conduit over a wide range of flow rates, in combination, a flow tube with an open nozzle disposed in the conduit, the nozzle directed into the gas stream to divert a small fraction of the total gas flow of the conduit into the flow tube whereby a total pressure head is developed in the flow tube proportional to the combined static head and velocity head of the gas flow in the conduit, a rotatable turbine member disposed to receive and to be rotated by the gas flowing in the flow tube, exhaust means for returning the gas from the turbine member to the conduit at a portion subsequent to the portion containing the nozzle, the turbine member rotating at a velocity proportional to the pressure difference between the gas pressure in the flow tube and in the exhaust means, each turn of the turbine corresponding accurately to a given amount of gas passing through the conduit over a given range of pressure differences, a register member operable by the rotating turbine member to indicate the amount of gas flow, the exhaust means including a port in the wall of the conduit, a pivotally mounted baffle member disposed in the conduit between the flow tube and the port, the baffle member so constructed and fitting the walls of the conduit that at zero and low gas flow rates up to a predetermined value, it assumes a first position wherein a major portion of the cross-section of the conduit is closed and only a fractional part of the cross-section of the conduit remains open to gas flow, means for pivotally mounting and resiliently controlling the baffle member to enable it to move to a second position whereby the conduit is open to allow substantially unrestricted gas flow, the last means operating to cause the baffle member to snap over from the first position to the second position upon the rate of gas flow in the conduit reaching the predetermined value and to snap back whenever the rate of gas flow falls below this predetermined value, the baffle member while in the first position at gas flow rates below said predetermined value producing a marked increase in static pressure differences between the gas in the conduit at the nozzle and at the port and consequently effecting similar pressure differences at the turbine member, the turbine velocity being accurately correlated to the gas pressure difference throughout all of the range of values so that each turn corresponds closely to the amount of gas passing through the conduit, while at high gas flow rates in the conduit above the said predetermined value the baffle member assumes the second position whereupon the static pressure difference in the conduit between the nozzle and the port is greatly diminished and the pressure difference acting on the turbine is essentially all due to the velocity head developed by the gas flow upon the nozzle, the velocity head from the snap-over point up to the maximum flow rate of gas in the conduit developing pressure differences at the turbine in substantially the same range values as developed as static head at low flow rates, a shiftable two speed gearing mechanism connected to and disposed between the turbine member and the register, the shiftable gearing mechanism including a shift member to impart a given low velocity or a high velocity output to the register for any selected turbine velocity, the shift member being operatively connected to the means for pivotally mounting and resiliently controlling the baffle member to shift the gearing from the low velocity output to the high velocity output upon the baffle member snapping over from the first position to the second position, and to shift the gearing from the high velocity output to the low velocity output when the baffle member snaps back from the second position to the first position.

3. In a fluid meter for measuring the amount of a gas flowing through a conduit, in combination, a nozzle member having one end disposed in the conduit, a nozzle plate disposed at the other end of the nozzle member, the nozzle member having a cross-section a fraction of that of the conduit to intercept a small portion of the total gas flowing in the conduit and leading the intercepted gases to the nozzle plate, a turbine disposed beyond the nozzle plate to receive and to be rotated by the gas intercepted by the nozzle member and passing through the nozzle plate, the turbine comprising two separate sets of blades, one set of blades being of a size and shape to develop a given torque from the intercepted gas directed thereagainst, and the other set of blades of a size and shape to develop substantially less torque, the nozzle plate having two sets of orifices, one set of orifices directed to direct intercepted gas at the said one set of blades and the second set of orifices to direct intercepted gas against the other set of blades, the second set of orifices and blades so constructed that the latter torque is opposite to that of the former torque and acting as a damping force on the turbine, exhaust means for returning the gas from the turbine to the conduit downstream beyond the point at which the nozzle is located, the turbine velocity being proportional to the pressure difference in the gas in the nozzle member and in the exhaust means, a register member operable by the turbine to indicate gas flow, the exhaust means including a port in the walls of the conduit, a baffle member disposed in the conduit between the nozzle member and the port, the baffle member so constructed and fitting the walls of the conduit that at low gas flow rates it assumes a first position wherein a major portion of the cross-section of the conduit is closed and only a fractional part of the cross-section of the conduit remains open to gas flow, means for pivotally mounting and resiliently controlling the baffle member to enable it to move to a second position whereby the conduit is open to allow substantially unrestricted gas flow, the last means operating to cause the baffle member to snap over from the first position to the second position upon the rate of gas flow in the conduit reaching a predetermined value and to snap back whenever the rate of gas flow falls below this predetermined value, a shiftable two speed gearing mechanism connected to and disposed between the turbine member and the register member, the gearing mechanism shiftable to impart a given low or high velocity output to the register member for a given turbine velocity, and means operatively connected to the means for pivotally mounting and resiliently controlling the baffle member to shift the gearing from a low velocity to a high velocity output as the baffle member snaps over from the first position to the second position and shifts back to a low velocity output as the baffle member snaps into the first position.

4. The fluid meter of claim 3, wherein the means for pivotally mounting the baffle member comprise a mounting pivot removed from the center of pressure of the gas flowing in the conduit on the baffle member, whereby the gas tends to develop a torque on the baffle member, and the means for resiliently controlling the baffle member include a spring member acting on the baffle member to oppose the torque on the baffle member, and a magnetic member also cooperating with the baffle member to oppose said torque.

5. The fluid meter of claim 3 wherein an opening is present in the wall of the conduit and an adjustable valve is disposed to cooperate with the opening to control the flow of gas through the opening, the opening being disposed upstream of the baffle, the opening leading to the exhaust means, whereby a part of the gas in the conduit bypasses the baffle when it is in the first position, said adjustable valve and opening enabling the calibration of the meter.

6. In a fluid meter, a conduit having a gas flowing therein, a pivoted baffle in the conduit mounted to assume a first position to greatly reduce the cross-section of the conduit open to gas flow, pivot means for the baffle disposed within the conduit, means for holding the baffle in said first position, said means comprising a spring, a magnet connected for movement with the baffle and adapted to assume one extreme position when the baffle is in the said position, and a keeper operatively associated with the magnet to apply a force assisting the spring, a register in the meter to indicate gas flow, a change gear mechanism connected to the register, means for shifting the change gear mechanism, the means for shifting comprising a lever on which the keeper is mounted and a resilient member applying a force on the lever opposing the attractive force of the magnet for the keeper, said force on the lever being insufficient to overcome the attractive force of the magnet when the magnet is in the one extreme position, but is sufficient when the baffle moves the magnet a predetermined distance from the one extreme position, the pivot means for the baffle being located at a point removed from the center of gas pressure on the baffle whereby when the gas flow exceeds a given amount the torque developed on the baffle exceeds the force exerted by the spring and the magnet and the baffle snaps to a position where it restricts the cross-section of the conduit to a substantially less extent than when in the first position.

7. In a fluid meter, a tube conveying a gaseous fluid, the tube having a vertical portion, a nozzle plate having two sets of nozzles with fixed openings peripherally arranged in an inner and outer circle, the vertical portion of the tube being disposed below the nozzle plate and conveying gas to the two sets of nozzles, the one set of nozzles being directed substantially perpendicular to the plane of the nozzle plate while the second set of nozzles are directed at a substantial angle off the vertical, a turbine rotor disposed above the nozzle plate, the rotor having a set of peripherally disposed driving blades disposed to be actuated in one direction by gaseous fluid from the second set of nozzles, and a second set of peripherally disposed damping vanes set at a different angle than the driving blades and attached to the driving blades, said set of damping vanes being at such an angle as to be actuated toward the opposite direction by gaseous fluid from the first set of nozzles, the driving blades developing a substantial force while the set of damping vanes develop a lesser force in the opposite direction and absorb excess energy developed by the driving blades.

8. In a fluid meter, in combination, a conduit conveying a gaseous fluid, a flow tube with a nozzle disposed in the conduit to intercept a small portion of the flow of the gaseous fluid, the flow tube returning the intercepted gaseous fluid to a port in the conduit at a point downstream from the place where it is intercepted by the nozzle, a movable baffle means disposed in the conduit between the port and the nozzle, the baffle means assuming a first position restricting flow of the gaseous fluid in the conduit whereby a relatively high static pressure develops in the gaseous fluid at the nozzle, a turbine disposed in the flow tube for rotation by the gaseous fluid intercepted by the nozzle, the velocity of rotation of the turbine being proportional to the square root of the difference in the gas pressure between the nozzle of the flow tube and at the port, the rotation of the turbine being accurately correlated to the amount of gaseous fluid passing through the conduit up to a predetermined flow rate, means for resiliently controlling movement of the baffle whereby when the flow of gaseous fluid reaches and exceeds the predetermined flow rate it moves to a second position wherein the baffle does not substantially restrict the flow of gaseous fluid, the differential pressure developed in the flow tube when the baffle means is in the second position being due to velocity head of the gaseous fluid impinging on the nozzle and the static head being substantially negligible, the rotation of the turbine being accurately correlated to the amount of gaseous fluid passing through the conduit, each turn of the turbine under the conditions when the baffle is in the second position representing a specific increase in the amount of gaseous fluid passing through the conduit as compared to the amount indicated by each turn of the turbine when the baffle was in the first position, a register connected to the turbine to integrate the turbine turns in terms of gaseous fluid passing through the conduit, a variable speed gearing disposed between the turbine and the register, the gearing having an output connection to the register and including a shifting mechanism to enable the output connection of the variable speed gearing to move the register at either a low speed or a high speed for the same speed of the turbine, the ratio of the low speed to the high speed being exactly proportional to the ratio of the amounts of gaseous fluid indicated by each turn of the turbine when the baffle is in the first and second positions, respectively, a gear shift lever for shifting said gearing when the baffle means goes from the first position to the second position, a spring and a magnet and a magnetizable member disposed to act in opposition to each other operatively connected to the gear shift lever, one of the magnet and magnetizable members comprising a part of said means for resiliently controlling movement of the baffle whereby when the baffle is in the first position the magnet is disposed to attract the magnetizable member and holds the gear shift lever to provide a low speed drive of the register by the turbine, while when the baffle is in the second position the magnet exerts little attractive force on the magnetizable member and the spring moves the gear shift lever to provide a high speed drive of the register by the turbine.

9. In a fluid meter, a conduit conveying a gas to be measured, by-pass means intercepting a part of the gas in the conduit at one point and returning the gas to another point downstream, a turbine rotatable over two similar ranges of velocity at high and low gas flow rates in said conduit, the by-pass means conveying gas to the turbine, a baffle means including a baffle and a pivotal mounting therefor located in the conduit at the said another point, the baffle means including a snap-over mechanism whereby the baffle assumes an open position or a substantially full-closed position upstream of said another point, said snap-over mechanism including a resilient holding means connected by a lever of variable effective length to the baffle to hold the baffle in the substantially fully closed position at the low gas flow rates in the conduit, the baffle being mounted eccentrically on the pivotal mounting so that gas flowing in the conduit exerts a turning force on the baffle opposing the resilient holding means such that on reaching a predetermined gas flow the force applied thereby on the baffle exceeds the force of the resilient means and snap action to open position occurs, the gas flow through the by-pass means varying with the baffle position, a register connected to the turbine to integrate the turns of the turbine, a two speed gear shift mechanism disposed between the turbine and the register, the gear shift mechanism providing for an output of either of two different speeds for a given turbine speed input, said gear shift mechanism including a gear shift lever controlling the output speed, an actuator member for moving the gear shift lever, means connected to the baffle means to move the actuator member and thereby move the gear shift lever, so that at low gas flow rates the output of the gear shift mechanism produces the lower output speed while at high flow rates the higher output speed is produced, the output speeds being correlated to the baffle position, the gear shift mechanism thereby enabling the register to integrate the actual flow of gaseous fluid in the conduit.

References Cited in the file of this patent

UNITED STATES PATENTS

| | | |
|---|---|---|
| 332,927 | Nash | Dec. 22, 1885 |
| 790,888 | Ferris | May 30, 1905 |
| 1,020,127 | Coleman | Mar. 12, 1912 |
| 1,875,511 | Shivers | Sept. 6, 1932 |
| 2,647,534 | Freeman | Aug. 4, 1953 |

FOREIGN PATENTS

| | | |
|---|---|---|
| 111,712 | Germany | July 7, 1900 |